(12) United States Patent
Tolentino

(10) Patent No.: US 11,897,436 B2
(45) Date of Patent: Feb. 13, 2024

(54) WINDSHIELD WIPER BLADE

(71) Applicant: Pylon Manufacturing Corp., Deerfield Beach, FL (US)

(72) Inventor: Vambi Raymundo Tolentino, Coconut Creek, FL (US)

(73) Assignee: Pylon Manufacturing Corp.

( * ) Notice: Subject to any disclaimer, the term of this patent is extended or adjusted under 35 U.S.C. 154(b) by 0 days.

(21) Appl. No.: 17/510,214

(22) Filed: Oct. 25, 2021

(65) Prior Publication Data

US 2022/0041136 A1    Feb. 10, 2022

Related U.S. Application Data

(63) Continuation of application No. 16/525,019, filed on Jul. 29, 2019, now Pat. No. 11,155,241, which is a
(Continued)

(51) Int. Cl.
*B60S 1/38* (2006.01)

(52) U.S. Cl.
CPC ............ *B60S 1/381* (2013.01); *B60S 1/3849* (2013.01); *B60S 1/3851* (2013.01); *B60S 1/3856* (2013.01); *B60S 1/3858* (2013.01); *B60S 1/3865* (2013.01); *B60S 1/3867* (2013.01); *B60S 1/3881* (2013.01); *B60S 1/3882* (2013.01); *B60S 1/3879* (2013.01);
(Continued)

(58) Field of Classification Search
CPC .... B60S 1/3858; B60S 1/3867; B60S 1/3865; B60S 1/3856; B60S 1/3851; B60S 1/381; B60S 1/3848; B60S 1/3882; B60S 1/3881; B60S 1/3875; B60S 2001/3817; B60S 2001/3818; B60S 2001/382; B60S 1/3879

See application file for complete search history.

(56) References Cited

U.S. PATENT DOCUMENTS 8,701,241 B2 * 4/2014 Kim .................. B60S 1/381
15/250.43
11,155,241 B2 * 10/2021 Tolentino .............. B60S 1/3858
(Continued)

FOREIGN PATENT DOCUMENTS

DE       212007000044    *  4/2009

OTHER PUBLICATIONS

English language translation of description portion of DE publication 212007000044, published Apr. 2009. (Year: 2009).*

*Primary Examiner* — Gary K. Graham

(57) ABSTRACT

A wiper blade including an elongate wiper strip, an elastic backing element and a mounting base. The wiper strip including a lip, a wide portion, and narrower intermediate portion between the lip and the wide portion. The backing element having a top portion from which two legs descend, such that each leg includes a claw that extends towards the opposite leg and has ends that define a gap sized to receive the intermediate portion of the wiper strip. The top portion, legs and claws of defining a wiper strip cavity where the wide portion of the wiper strip is disposed. The mounting base disposed on a section of the backing element and capable of connecting the wiper blade to a wiper arm and receiving force from same, such that the mounting base applies the force from the wiper arm to the backing element, which distributes same along the wiper strip.

13 Claims, 16 Drawing Sheets

Related U.S. Application Data continuation of application No. 15/335,138, filed on Oct. 26, 2016, now Pat. No. 10,363,905.

(60) Provisional application No. 62/246,567, filed on Oct. 26, 2015.

(52) U.S. Cl.
CPC .. *B60S 2001/382* (2013.01); *B60S 2001/3817* (2013.01); *B60S 2001/3818* (2013.01)

(56) References Cited

U.S. PATENT DOCUMENTS

| | | | |
|---|---|---|---|
| 2010/0064468 A1* | 3/2010 | Kang | B60S 1/3889 15/250.48 |
| 2014/0359963 A1* | 12/2014 | An | B60S 1/381 15/250.201 |
| 2019/0351876 A1* | 11/2019 | Tolentino | B60S 1/3882 |

* cited by examiner

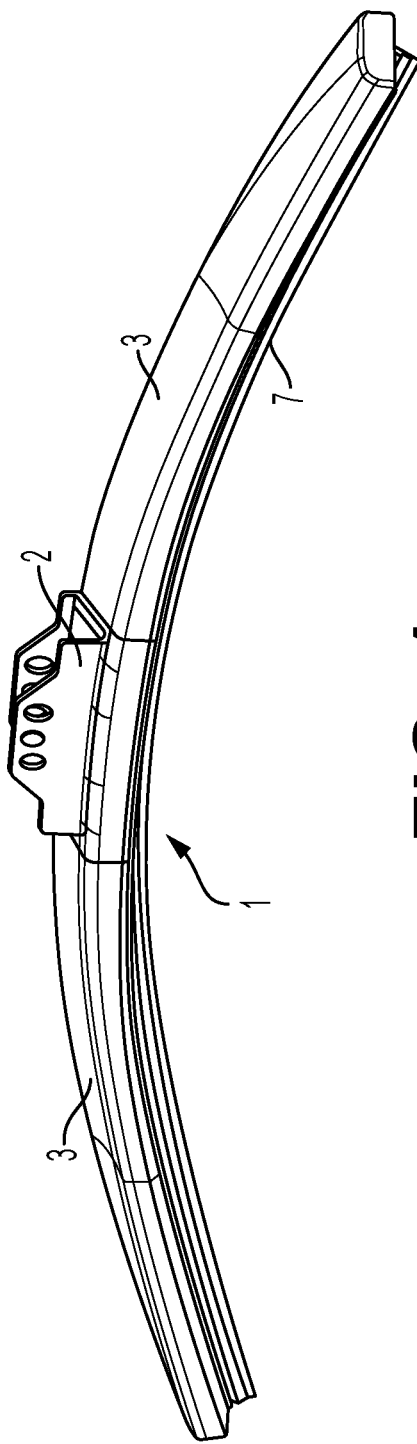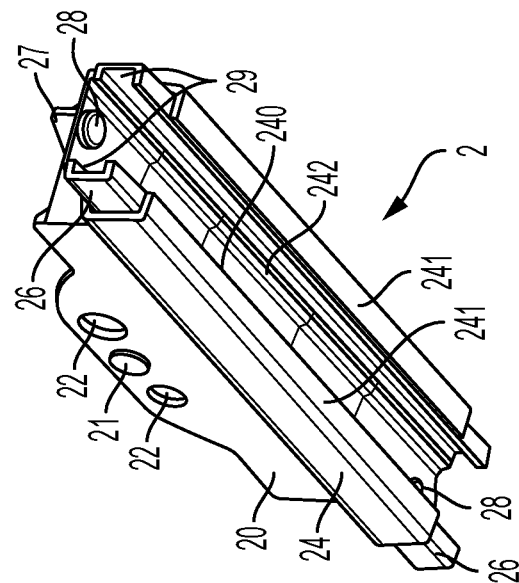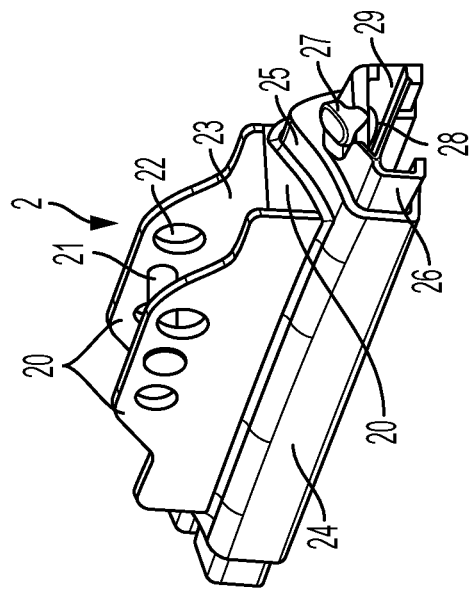

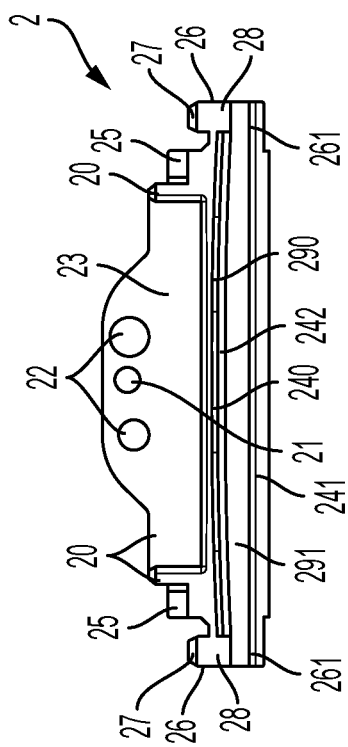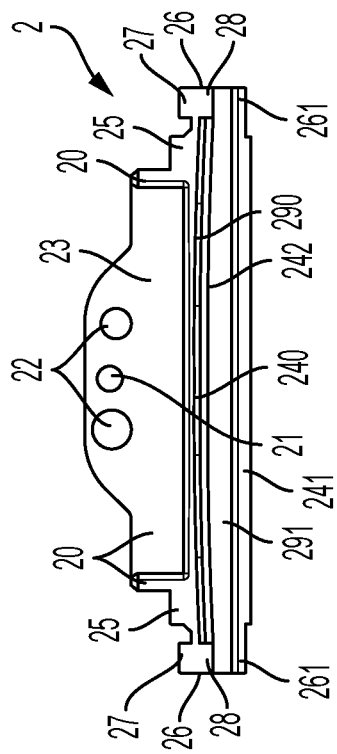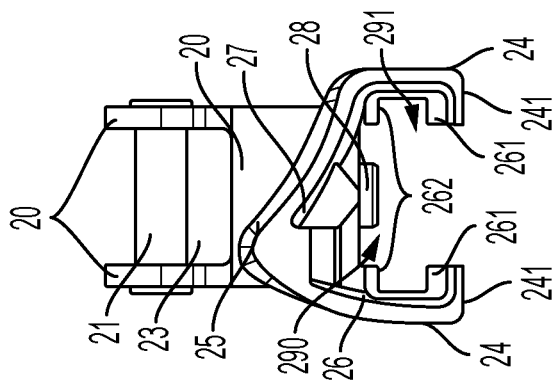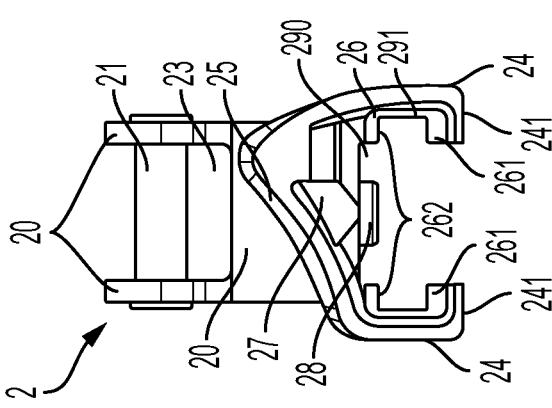

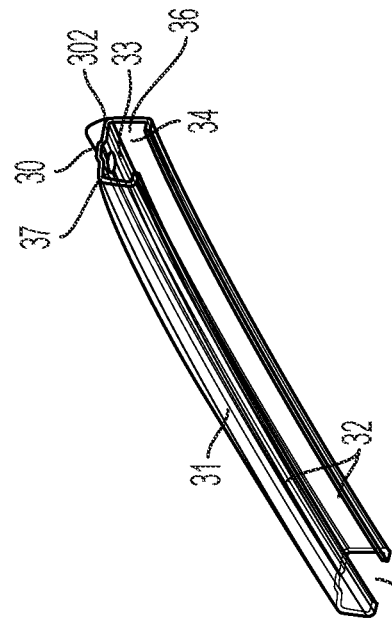
FIG. 12
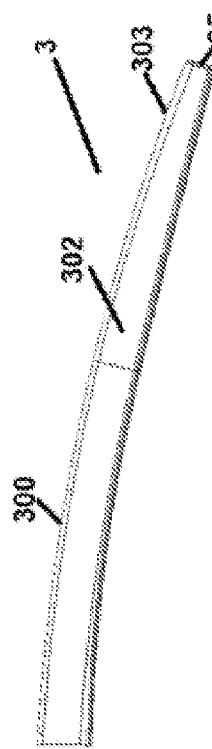
FIG. 14
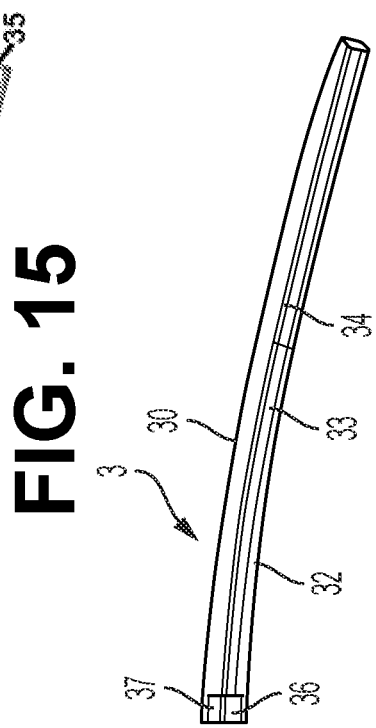
FIG. 16
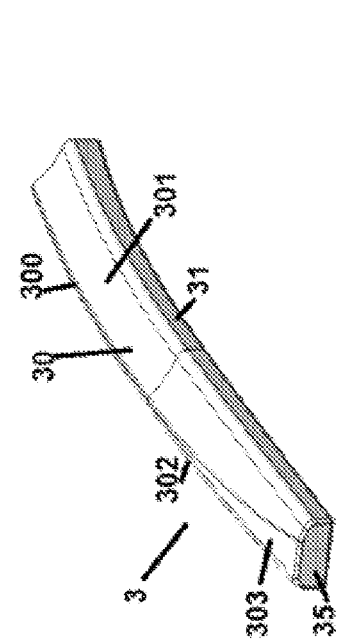
FIG. 13
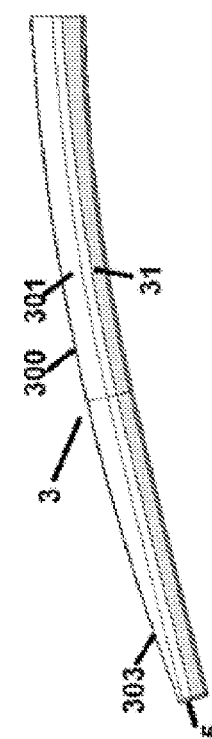
FIG. 15
FIG. 17

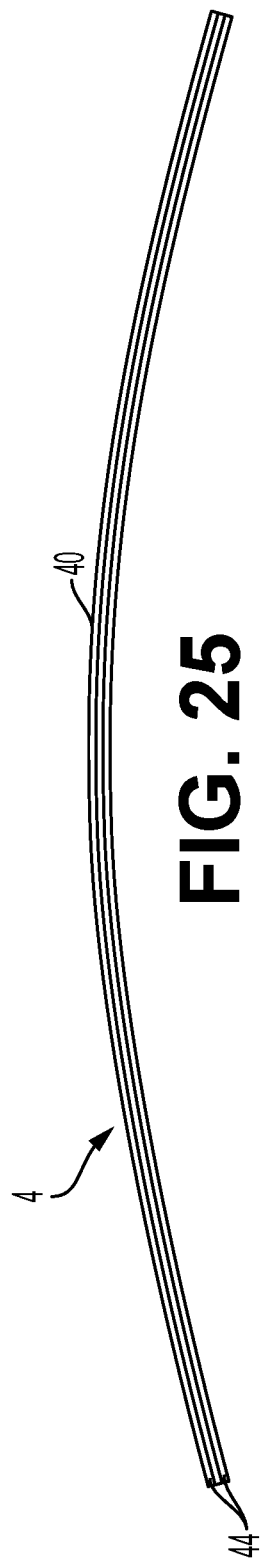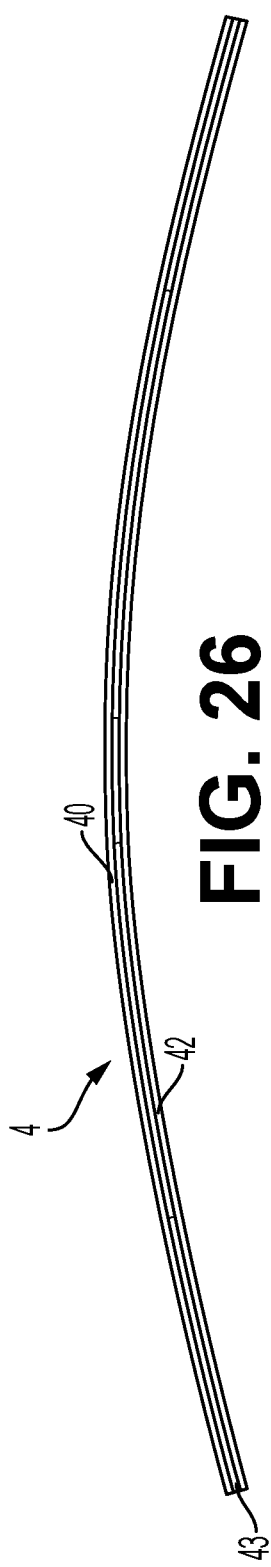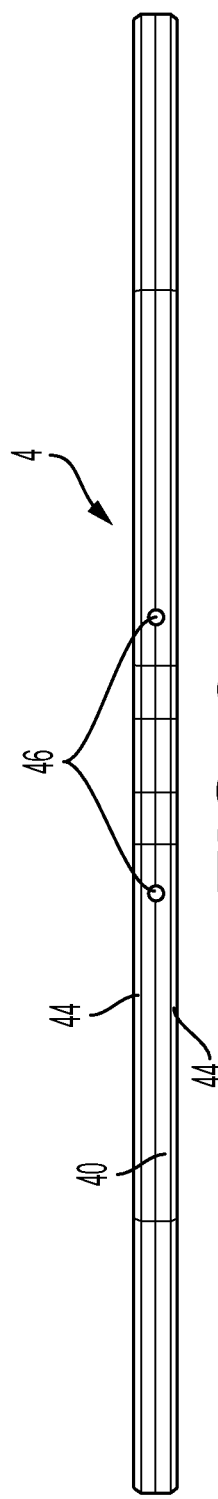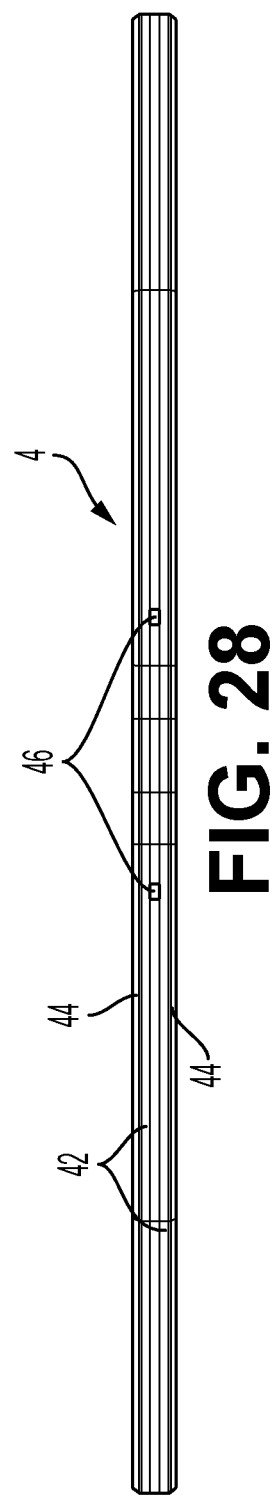

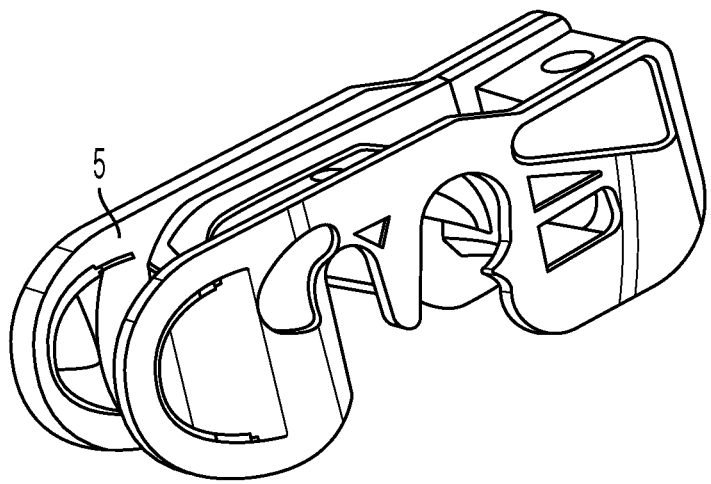
FIG. 29
FIG. 30
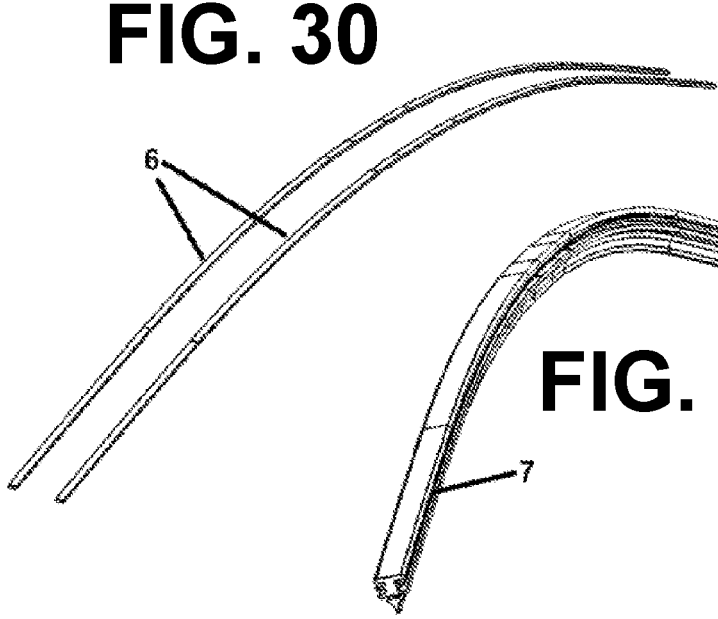
FIG. 31

WINDSHIELD WIPER BLADE

CROSS-REFERENCE TO RELATED APPLICATIONS

This application is a continuation of U.S. patent application Ser. No. 16/525,019 filed Jul. 29, 2019, which is a U.S. patent application Ser. No. 15/335,138, filed Oct. 26, 2016, which claims priority from U.S. Provisional Patent Application No. 62/246,567, filed Oct. 26, 2015, the entire contents of which are herein incorporated by reference.

TECHNICAL FIELD

Aspects of the disclosure relate in general to windshield wipers, and more particularly, to a wiper blade including a backing element, a wiper strip, a mounting base and a cover.

BACKGROUND

There are a variety of different types of wiper blades currently used on vehicles. "Traditional" or "conventional" wiper blades have a series of brackets (also called yokes or frames) arranged in tournament-style, which distribute the force from the wiper arm down to the wiper strip. "Beam" wiper blades, or beam blades, use a spring-elastic metal beam (also called a support element) to distribute the force from the wiper arm to the wiper strip. "Hybrid" wiper blades use both a beam and brackets to distribute the force from the wiper arm to the wiper strip.

The disclosed concepts offer a new solution, using a shaped backing element in place of a beam or traditional frames.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In certain embodiments, a wiper blade may include an elongate wiper strip, an elastic backing element and a mounting base. The elongate wiper strip may include a wiping lip, a wide portion, and an intermediate portion between the wiping lip and the wide portion, such that the intermediate portion is narrower than the wide portion. The elastic elongate backing element may have a top portion from which two opposing, elongate legs descend, such that each leg includes an elongate claw that extends towards the opposite leg. Each leg may have an end such that the ends of the claws of the two legs may define a gap sized to receive the intermediate portion of the wiper strip. The top portion, legs and claws of the backing element may define a wiper strip cavity such that the wide portion of the wiper strip may be disposed within the wiper strip cavity. The mounting base may be capable of connecting the wiper blade to a wiper arm, and capable of receiving a force from the wiper arm. The mounting base may be disposed on a section of the backing element such that the mounting base is capable of applying a force from the wiper arm to the backing element. In turn, the backing element may thereby be capable of distributing the force along the length of the wiper strip.

In certain embodiments, a wiper blade may include an elongate wiper strip, an elastic backing element, a mounting base and first and second cover sections. The wiper strip may include a wiping lip, a wide portion, and an intermediate portion between the wiping lip and the wide portion, such that the intermediate portion is narrower than the wide portion. The backing element may include a top portion from which two opposing, elongate legs descend, such that each leg comprises an elongate claw that extends towards the opposite leg. The claws may have ends such that the ends of the claws of the two legs may define a gap sized to receive the intermediate portion of the wiper strip. The top portion, legs and claws may define a wiper strip cavity such that the wide portion of the wiper strip is disposed within the wiper strip cavity. The mounting base may be capable of connecting the wiper blade to a wiper arm and receiving force from the wiper arm. The mounting base may be disposed on a section of the backing element such that the mounting base is capable of applying a force from the wiper arm to the backing element, and the backing element is capable of distributing the force along the length of the wiper strip. A first cover section may extend from a first end of the mounting base to a first end of the backing element. A second cover section may extend from a second end of the mounting base to a second end of the backing element. The first and second ends of the mounting base may be provided with projecting extensions. The first and second cover sections may be provided with extension recesses. The projecting extensions of the first and second ends of the mounting base may fit within, and be covered by, the extension recesses of the first and second cover sections, respectively.

In certain embodiments, a wiper blade may include an elongate wiper strip, an elastic backing element, a mounting base and a first cover section. The elongate wiper strip may include a wiping lip, a wide portion, and an intermediate portion between the wiping lip and the wide portion, wherein the intermediate portion is narrower than the wide portion. The elastic, elongate backing element may have a top portion from which two opposing, elongate legs descend, such that each leg may include an elongate claw that extends towards the opposite leg. The claws may each have an end such that the ends of the claws of the two legs may define a gap sized to receive the intermediate portion of the wiper strip. The top portion, legs and claws may define a wiper strip cavity and the wide portion of the wiper strip may be disposed within the wiper strip cavity. The mounting base may be capable of connecting the wiper blade to a wiper arm and may receive a force from the wiper arm. The mounting base may be disposed on a section of the backing element such that the mounting base may be capable of applying a force from the wiper arm to the backing element, and the backing element may be capable of distributing the force along the length of the wiper strip. The first cover section may extend from a first end of the mounting base to a first end of the backing element. The first end of the mounting base may include a projecting extension, and the first cover section may include an extension recess, such that the projecting extension fits within, and is covered by, the extension recess of the first cover section. The mounting base may further include a first and second base wall which may extend downwards from a bottom surface. Each base wall may be provided with a bottom base claw which extends inwardly towards the other base wall, such that the base walls cover and secure the portion of the backing element on which the mounting base is disposed.

BRIEF DESCRIPTION OF THE DRAWINGS

The drawings set forth exemplary embodiments of the disclosed concepts, and are not intended to be limiting in any way.

FIG. 1 illustrates a perspective view of an embodiment of a wiper blade.

FIG. 2 illustrates a perspective view from above of the mounting base of the wiper blade shown in FIG. 1.

FIG. 3 illustrates a perspective view from below of the mounting base of the wiper blade shown in FIG. 1.

FIG. 8 illustrates a side view of the mounting base of the wiper blade shown in FIG. 1.

FIG. 9 illustrates a side view of the mounting base of the wiper blade shown in FIG. 1.

FIG. 10 illustrates a cross-sectional view from the front of the mounting base of the wiper blade shown in FIG. 1.

FIG. 11 illustrates a cross-sectional view from behind of the mounting base of the wiper blade shown in FIG. 1.

FIG. 12 illustrates a perspective view from above of a cover section of the wiper blade shown in FIG. 1.

FIG. 13 illustrates a perspective view from below of a cover section of the wiper blade shown in FIG. 1.

FIG. 14 illustrates a front view of a cover section of the wiper blade shown in FIG. 1.

FIG. 15 illustrates a back view of a cover section of the wiper blade shown in FIG. 1.

FIG. 16 illustrates a cross-sectional view from the front of a cover section of the wiper blade shown in FIG. 1.

FIG. 17 illustrates a cross-sectional view from behind of a cover section of the wiper blade shown in FIG. 1.

FIG. 25 illustrates a front view of the shaped backing element of the wiper blade shown in FIG. 1.

FIG. 26 illustrates a cross-sectional view from the front of the shaped backing element of the wiper blade shown in FIG. 1.

FIG. 27 illustrates a top view of the shaped backing element of the wiper blade shown in FIG. 1.

FIG. 28 illustrates a bottom view of the shaped backing element of the wiper blade shown in FIG. 1.

FIG. 29 illustrates an example connector that may be used with the wiper blade shown in FIG. 1.

FIG. 30 illustrates a perspective view from above of the vertebrae of the wiper blade shown in FIG. 1.

FIG. 31 illustrates a perspective view from above of the wiper strip of the wiper blade shown in FIG. 1.

DETAILED DESCRIPTION OF THE ILLUSTRATIVE EMBODIMENT

Figure 1A:
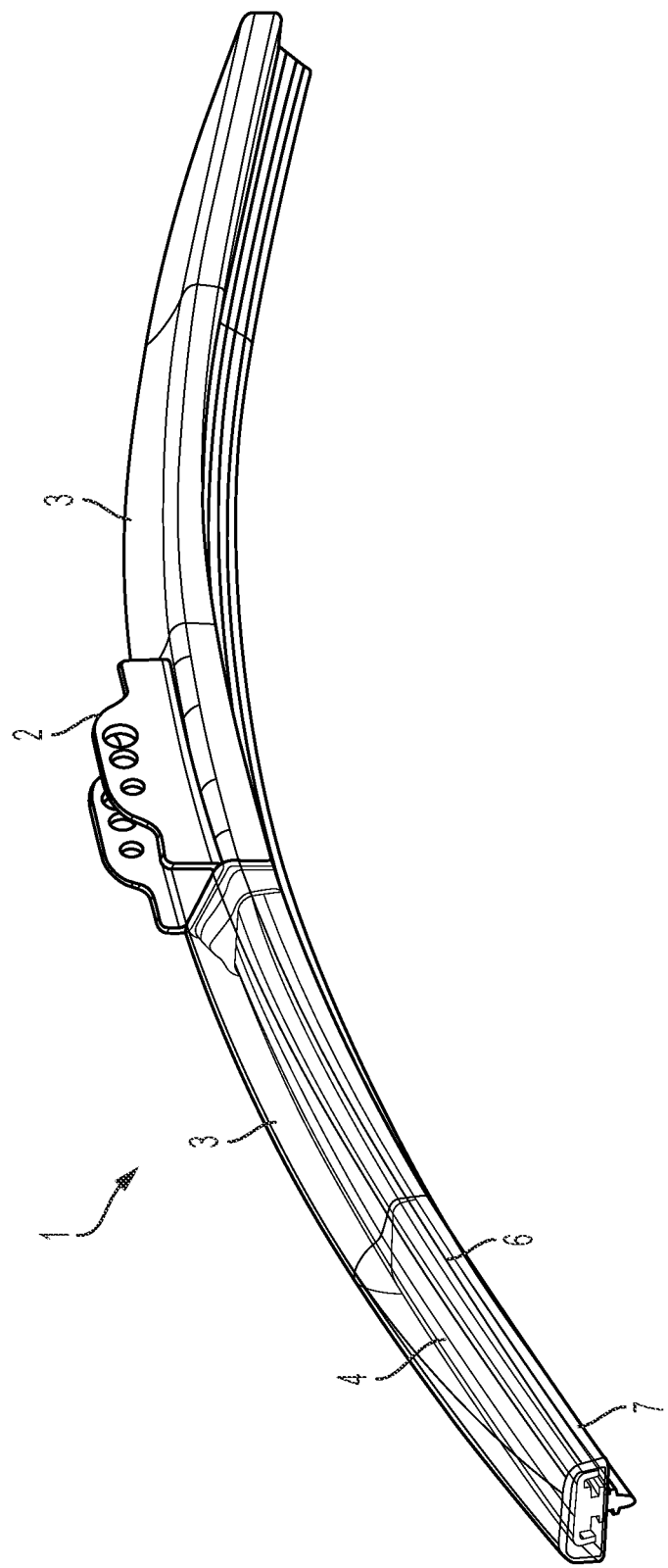
FIG. 1A illustrates a perspective view of the wiper blade shown in FIG. 1, with a portion of the cover drawn transparent.

The following detailed description and the appended drawings describe and illustrate exemplary embodiments solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

In certain embodiments a wiper blade may include an elongate wiper strip, an elastic backing element and a mounting base. The elongate wiper strip may include a wiping lip, a wide portion, and an intermediate portion between the wiping lip and the wide portion, such that the intermediate portion is narrower than the wide portion. The elastic elongate backing element may have a top portion from which two opposing, elongate legs descend, such that each leg includes an elongate claw that extends towards the opposite leg. Each leg may have an end such that the ends of the claws of the two legs may define a gap sized to receive the intermediate portion of the wiper strip. The top portion, legs and claws of the backing element may define a wiper strip cavity such that the wide portion of the wiper strip may be disposed within the wiper strip cavity. The mounting base may be capable of connecting the wiper blade to a wiper arm, and capable of receiving a force from the wiper arm. The mounting base may be disposed on a section of the backing element such that the mounting base is capable of applying a force from the wiper arm to the backing element. In turn, the backing element may, thereby, be capable of distributing the force along the length of the wiper strip.

In certain embodiments, the top portion of the backing element may include a securing hole disposed within the section of the backing element on which the mounting base is disposed. In certain such embodiments, the mounting base may include a backing element securing peg, wherein the backing element securing peg is disposed within the securing hole of the backing element.

In certain embodiments, a first cover section may extend from a first end of the mounting base to a first end of the backing element. In certain embodiments, the first end of the mounting base further comprises a projecting extension, and the first cover section may be provided with an extension recess, such that the projecting extension fits within, and is covered by, the extension recess of the first cover section. In certain such embodiments, the mounting base may also include a cover securing peg located on the projecting extension, and the first cover section may include a securing hole located in the extension recess, wherein the cover securing beg is located within the securing hole. In certain embodiments, a second cover section may extend from a second end of the mounting base to a second end of the backing element. In certain embodiments, the first cover section may be provided with at least one leg, such that the leg comprises a bottom claw, wherein the bottom claw secures the first cover section to the backing element.

In certain embodiments, the first cover section may include a backing element cavity, and the backing element may include a first covered section extending from the first end of the mounting base to the first end of the backing element, wherein the first covered section of the backing element is disposed within the backing element cavity of the first cover section. In certain such embodiments, the backing element cavity of the first cover section may include a backing element top cavity, such that the top portion of the backing element top cavity is disposed within the backing element top cavity along the first covered section of the backing element. In certain embodiments, the backing element may further include a first rail, and the first cover section may further include a backing element channel cavity such that the first rail of the backing element is disposed within the backing element channel cavity of the first cover section along the first covered section of the backing element. In certain embodiments, the backing element may include a second rail, wherein a first groove is formed by and between the first rail and the second rail. In certain such embodiments, a vertebra is disposed within the first groove. In certain embodiments, the backing element further comprises third and fourth rails, wherein a second groove is formed by and between the third and fourth rails, and a second vertebra is disposed within the second groove.

In certain embodiments, the first cover section may embody a spoiler having an apex and an attack surface. In certain embodiments, a vertebra may be disposed inside the wiper strip cavity above the wiper strip.

In certain embodiments, the mounting base may further include a first and second base wall which extend downwards from a bottom surface, such that each base wall is provided with a bottom base claw which extends inwardly towards the other base wall. The base walls may cover and secure the portion of the backing element on which the mounting base is disposed.

In certain embodiments, the mounting base may include a pair of cavity walls and a rivet extending therebetween such that the rivet may receive and secure a connector such that the mounting base is capable of connecting to a wiper arm through the use of the connector.

In certain embodiments, a wiper blade may include an elongate wiper strip, an elastic backing element, a mounting base and a first cover section. The elongate wiper strip may include a wiping lip, a wide portion, and an intermediate portion between the wiping lip and the wide portion, wherein the intermediate portion is narrower than the wide portion. The elastic, elongate backing element may have a top portion from which two opposing, elongate legs descend such that each leg may include an elongate claw that extends towards the opposite leg. The claws may each have an end such that the ends of the claws of the two legs may define a gap sized to receive the intermediate portion of the wiper strip. The top portion, legs and claws may define a wiper strip cavity and the wide portion of the wiper strip may be disposed within the wiper strip cavity. The mounting base may be capable of connecting the wiper blade to a wiper arm and may receive a force from the wiper arm. The mounting base may be disposed on a section of the backing element such that the mounting base may be capable of applying a force from the wiper arm to the backing element, and the backing element may be capable of distributing the force along the length of the wiper strip. The first cover section may extend from a first end of the mounting base to a first end of the backing element. The first end of the mounting base may include a projecting extension, and the first cover section may include an extension recess, such that the projecting extension fits within, and is covered by, the extension recess of the first cover section. The mounting base may further include a first and second base wall which may extend downwards from a bottom surface. Each base wall may be provided with a bottom base claw which extends inwardly towards the other base wall, such that the base walls cover and secure the portion of the backing element on which the mounting base is disposed.

Figure 1B:
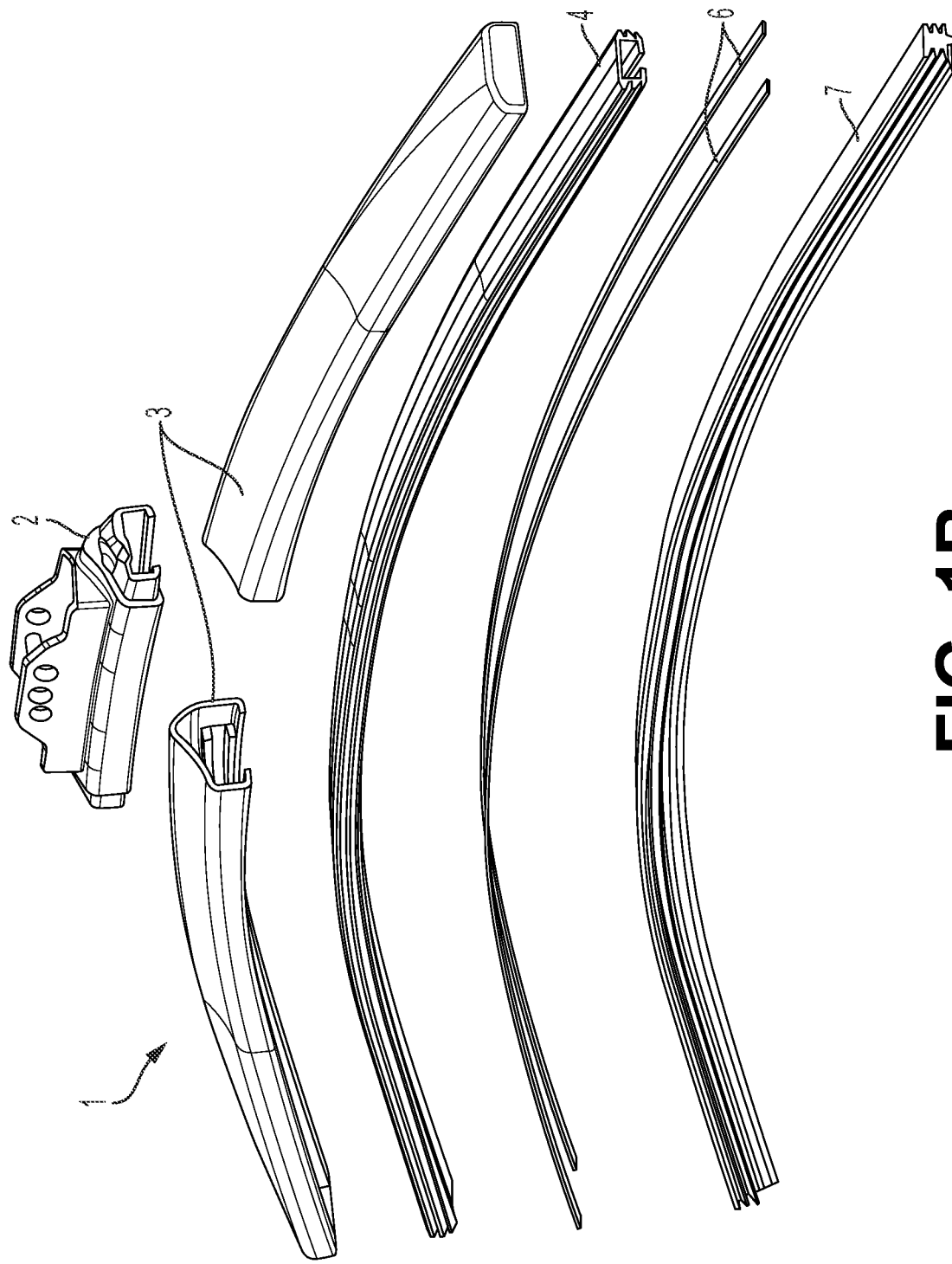
FIG. 1B illustrates a perspective view of an exploded rendition of the components of the wiper blade shown in FIG. 1.
Figure 4:
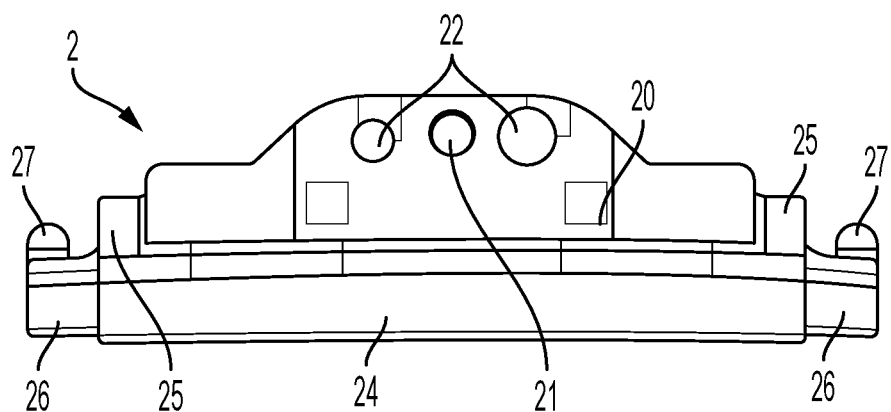
FIG. 4 illustrates a front view of the mounting base of the wiper blade shown in FIG. 1.
Figure 5:
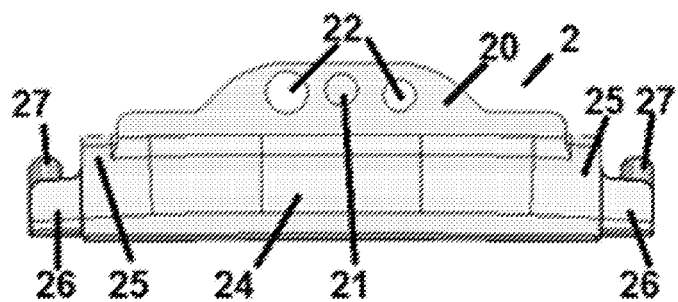
FIG. 5 illustrates a back view of the mounting base of the wiper blade shown in FIG. 1.
Figure 6:
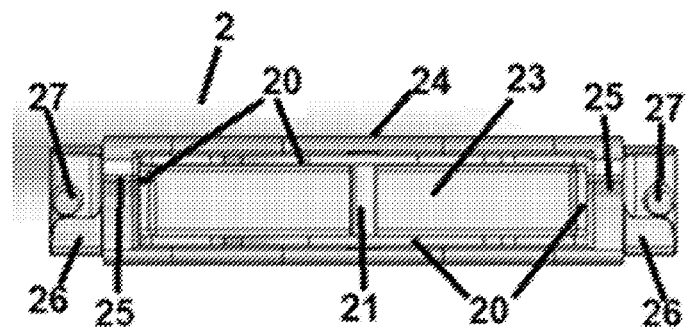
FIG. 6 illustrates a top view of the mounting base of the wiper blade shown in FIG. 1.

FIGS. 1, 1A and 1B illustrate a wiper blade 1 which may have a mounting base 2, cover sections 3, a backing element 4, vertebrae 6, and a wiper strip 7. The mounting base 2 may be configured to connect to a wiper arm through the use of a connector 5 or an adapter. One possible connector 5 which may be used in accordance with the disclosed concepts is depicted in FIG. 29. Such a connector is described in U.S. Pat. No. 6,640,380, which is incorporated herein by reference in its entirety. Any other suitable connectors or adapters known in the art may also be used with the disclosed concepts, including the connectors described in U.S. Pat. Nos. 8,806,700 and 9,108,595, and U.S. Publication Nos. 2013/0185889, 2013/0192015, 2014/0283325 and 2015/0251637, which are each incorporated herein by reference in their entireties. Persons of skill in the art will also recognize that the mounting base may be specifically adapted to connect to a particular type of wiper arm directly without the use of a connector or an adapter, including the mounting base designs disclosed in U.S. Publication No. 2014/0082875, which is incorporated herein by reference in its entirety. Similarly, persons of skill in the art will recognize that the cover with a spoiler depicted in FIGS. 1, 1A and 1B is exemplary, and that any suitable cover, with or without a spoiler, may also be used in accordance with the disclosed concepts, including covers having spoilers with constant height and shape, covers having decreasing height, spoilers forming a centered isosceles triangle, or an off-center spoiler (as shown in FIGS. 1, 1A and 1B), including covers as described in U.S. Patent Publication Nos. 2012/0266405 and 2013/0205532, which are incorporated herein by reference in their entirety. Additionally, persons of ordinary skill in the art will recognize that any suitable wiper strip known in the art may be used in accordance with the disclosed concepts, including the wiper strips described in U.S. Provisional Application Ser. No. 62/139,383, which is incorporated herein by reference in its entirety.

One exemplary mounting base 2 that may be used in accordance with the disclosed concepts is illustrated in FIGS. 2-11. The mounting base is preferably made of hard plastic, though any other suitable material or combination of materials known in the art, including metals, rubber, and resins, may also be used. In some embodiments, the mounting base, or portions thereof, may be made from a material having a Shore Hardness A of 85±5 or greater. In some embodiments, the mounting base, or portions thereof, may be made from a material having a Shore Hardness A of 95±5 or greater. In other embodiments, the mounting base 2 may be made from multiple materials, or have multiple hardnesses. For example, in one such embodiment, the hardness of the cavity walls 20 and claws 241, 242, 261, 262 and the material joining same may be greater than the hardness of the other parts of the mounting base 2. For example, the cavity walls 20 and claws 241, 242, 261, 262 may be made from metal or hard plastic, while the other portions of the mounting base 2 may be made from a softer plastic or rubber. Persons of skill in the art will recognize that disclosed concepts may be implemented in many different ways, and different design choices may be made with respect to materials for all components, including the mounting base.

The mounting base 2 may have two or more cavity side walls 20 defining a cavity 23 therebetween. As shown in FIG. 2, two of the sidewalls 20 may extend in the longitudinal direction of the wiper blade 1, and a rivet 21 may extend and be secured between same. The mounting base may further have one or more pin holes 22 to allow the pin of a pin-type wiper arm to pass through and be secured, by a connector 5 or otherwise. The mounting base may further have a shoulder 25 having a shape that is complementary to, identical to, or otherwise follows the shape of the cover sections 3. The mounting base may have a base section 24 defining a backing element cavity 29 therewithin. The base section 24 may have a base bottom surface 240, legs, a base bottom claw 241, and a base top claw 242.

As shown in FIG. 3, the base bottom surface 240 may be recessed from the top claw 242 to form a backing element top cavity 290. The base bottom claw 241 and base top claw 242 may form a groove having a backing element channel cavity 291 therewithin. The backing element cavity 29 may receive the backing element 4, with the top portion 40 of the backing element 4 being received by the backing element top cavity 290 and the rails 44 and vertebra 6 being received by the channel cavity 291. If no vertebrae are located in the groove 45 between the rails 44 of the backing element, the mounting base 2 may include an intermediate claw (not shown) to engage and accommodate the groove 45. The mounting base may further have one or more backing element securing pegs 28, which may extend from the base bottom surface 240 and engage securing holes 46 in the backing element. The mounting base 2 may also have one or more cover securing pegs 27 that engages with a securing hole 37 in the cover section in order to secure the cover section 3 to the mounting base 2.

Figure 34:
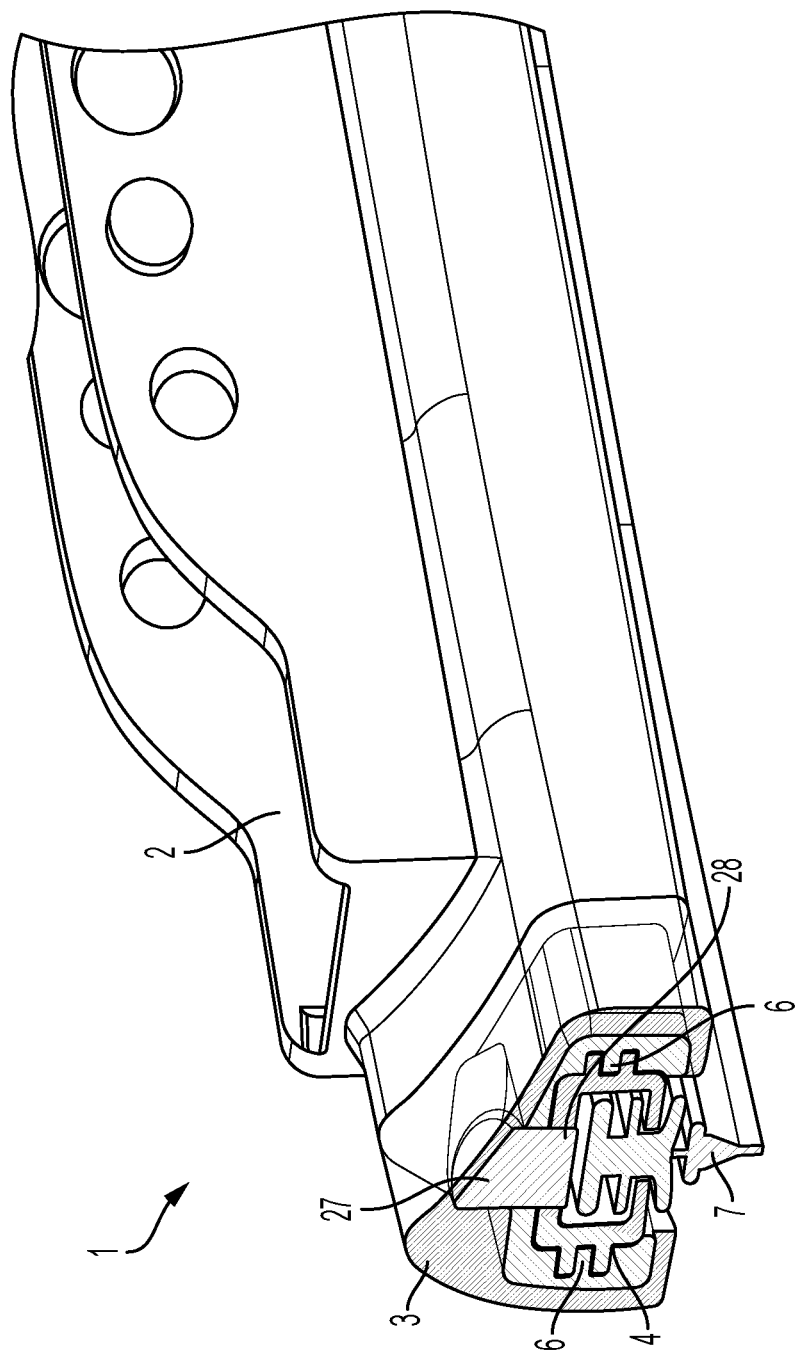
FIG. 34 illustrates a perspective view from above of the junction between the mounting base, backing element and cover section of the wiper blade shown in FIG. 1.
Figure 35:
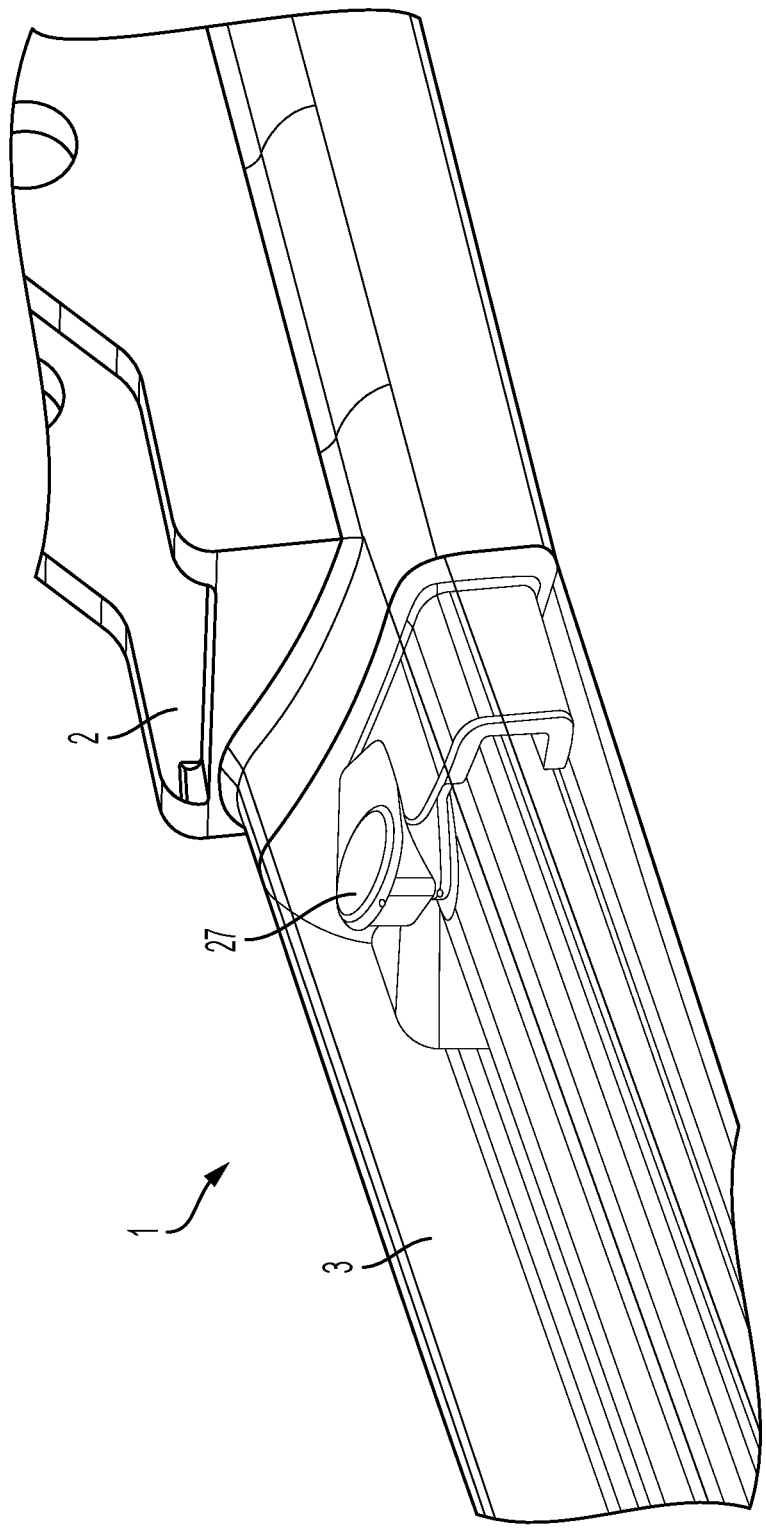
FIG. 35 illustrates a perspective view from above of the junction between the mounting base and cover section of the wiper blade shown in FIG. 1.

The mounting base may further have a projecting extension 26, which projects into, and is received by the extension recess 36 in the cover section 3, as shown in FIGS. 34 and 35. Persons of skill in the art will recognize that the projecting extension 26 and the extension recess 36 may be swapped such that the mounting base 2 may have an extension recess that receives a projecting extension from the cover section 3. As shown in FIGS. 2-6, the projecting extension 26 may be recessed from the base wall 24 and shoulder 25. As also shown in those figures, the securing pegs 27, 28 may be disposed on the projecting extension 26. The securing pegs 27, 28 and securing hole 37, 46 may engage via a snap fit, friction fit, or other form fitting connection. Persons of skill in the art will recognize that the securing mechanism may be swapped, having the securing holes located in the mounting base 2, and the securing pegs located in the cover section/backing element. Persons of skill in the art will also recognize that any other suitable securing mechanism known in the art may be used, including detents and recesses, dovetails, opposed projections, and other such structures may be used. Persons of skill in the art will also recognize that the securing mechanism need not be on the top surface of the projecting extension, but may be on the side, or may extend from the side of the shoulder, or any other arrangement known in the art.

Figure 7:
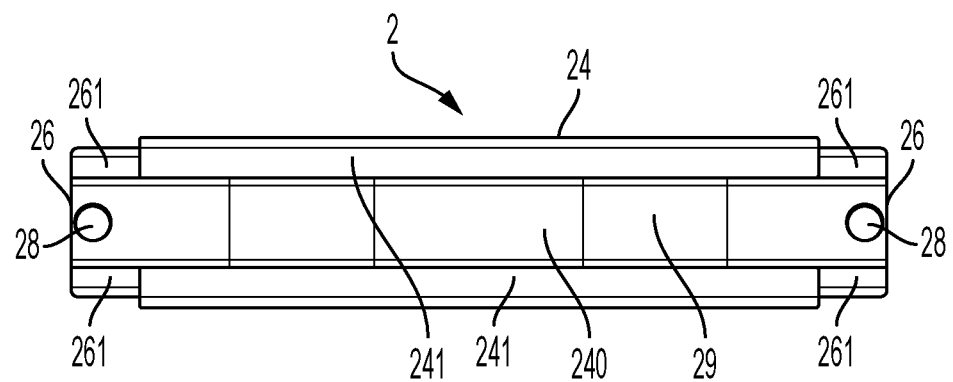
FIG. 7 illustrates a bottom view of the mounting base of the wiper blade shown in FIG. 1.
Figure 20:
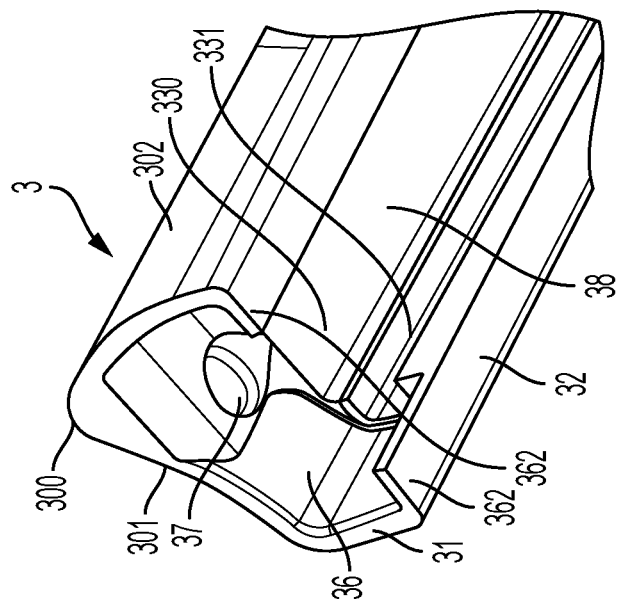
FIG. 20 illustrates a perspective view from below of a cover section of the wiper blade shown in FIG. 1.
Figure 19:
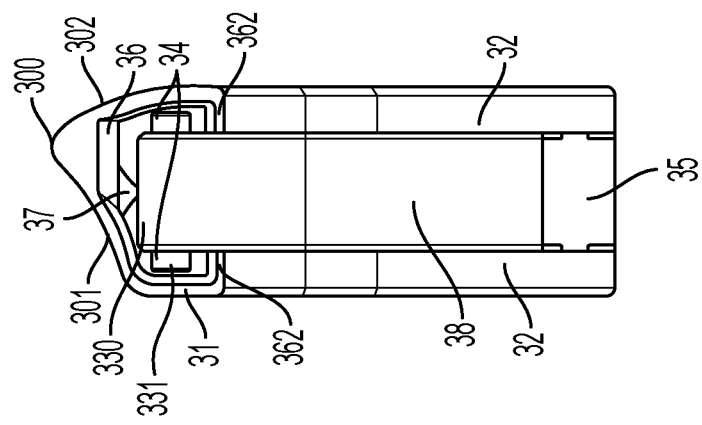
FIG. 19 illustrates a side view of a cover section of the wiper blade shown in FIG. 1.
Figure 18:
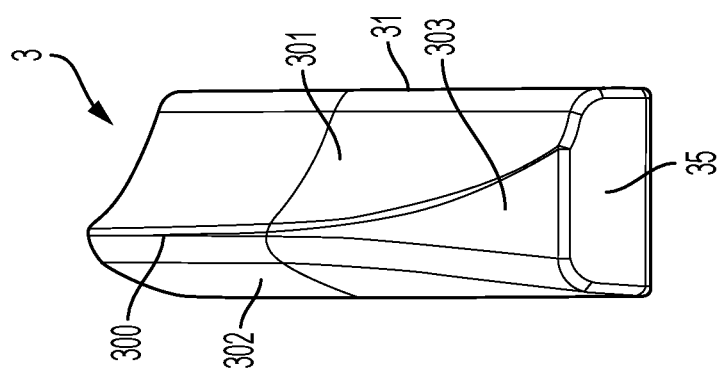
FIG. 18 illustrates a side view of a cover section of the wiper blade shown in FIG. 1.
Figure 21:
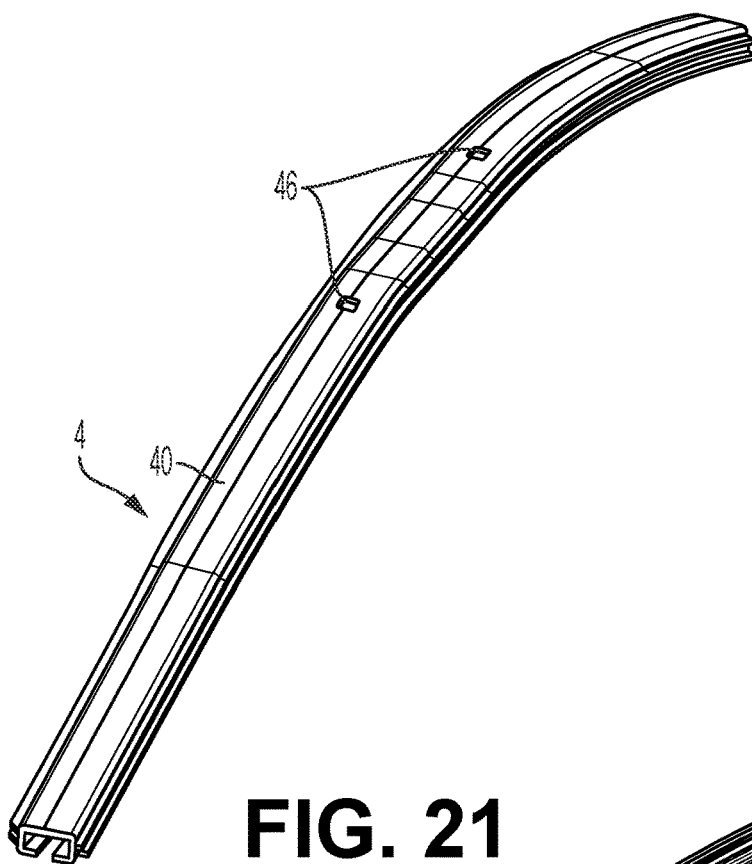
FIG. 21 illustrates a perspective view from above of the shaped backing element of the wiper blade shown in FIG. 1.
Figure 22:
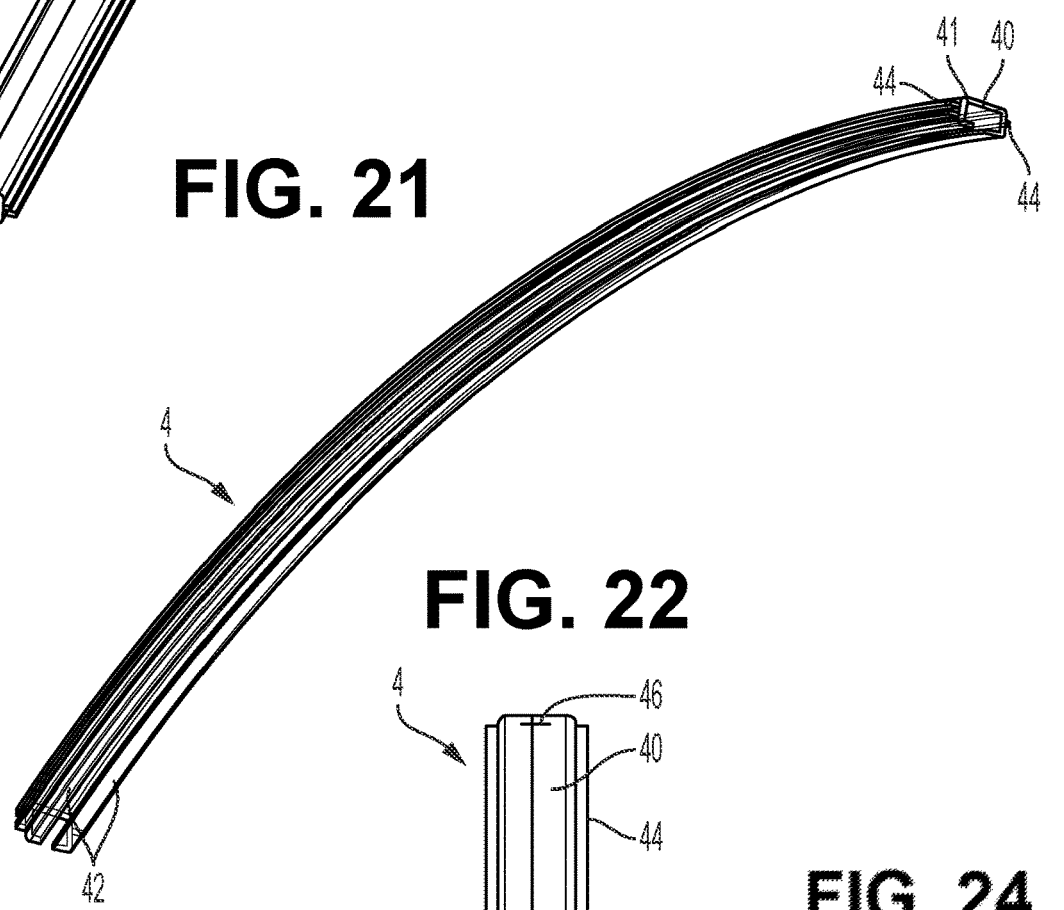
FIG. 22 illustrates a perspective view from below of the shaped backing element of the wiper blade shown in FIG. 1.
Figure 23:
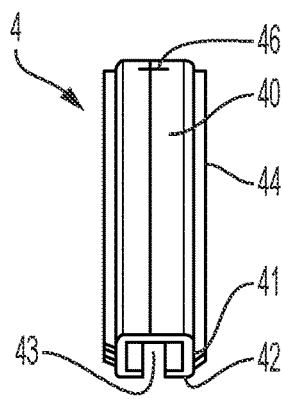
FIG. 23 illustrates a side view of the shaped backing element of the wiper blade shown in FIG. 1.

As shown in FIGS. 3 & 7, the base bottom surface 240 may extend and continue into the projection 26. Similarly, the projecting extension may include an extension top claw 262 and an extension bottom claw 261 that may extend from and be aligned with the top base claw 242 and bottom base claw 241, respectively.

FIGS. 12-20 illustrate an exemplary cover section 3 in accordance with the disclosed concepts. The cover section 3 is preferably made of soft, elastic plastic or rubber, although any other suitable material or combination of materials known in the art, such as resins and silicon, for instance, may be used. In some embodiments, the cover section, or portions thereof, may be made from a material having a Shore Hardness A of 70±5 or less. In other embodiments, the cover section, or portions thereof, may be made from a material having a Shore Hardness A of 60±5 or less. In other embodiments, the mounting base 2 may be made from multiple materials, or having multiple hardnesses. It may be advantageous to have some portions of the cover section, such as the claws, made from a harder material, such as one having a Shore Hardness A of 85±5 or greater, or one having a Shore Hardness A of 95±5 or greater. For example, in one such embodiment, the hardness of the claws 32, 34 352 may be greater than the hardness of the other parts of the cover section 3. For example, the claws 32, 34 352 may be made from hard plastic, while the other portions of the cover section 3 may be made from a softer plastic or rubber. Persons of skill in the art will recognize that disclosed concepts may be implemented in many different ways, and different design choices may be made with respect to materials for all components, including the cover section.

Figure 36:
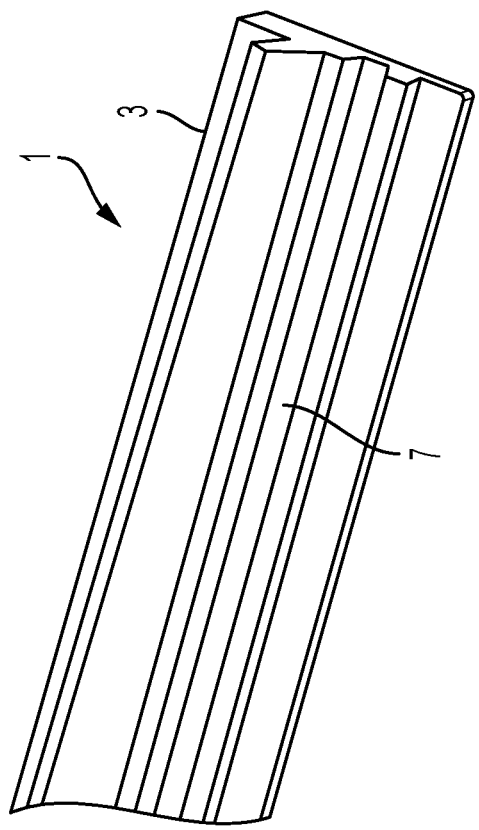
FIG. 36 illustrates a perspective view from below of the end of the wiper strip and cover section of the wiper blade shown in FIG. 1.

The cover section 3 may include a top surface 30. As discussed above, any suitable cover known in the art may be used, with or without a spoiler. As shown in FIGS. 12-20, the top surface of the cover 30 may form a spoiler having an apex 300, an attack surface 301, and a back surface 302. As shown in FIG. 12, the attack surface 302 may be concave. The cover may further have at least one leg 31, where the back surface 302 may blend into, or be in line with, the leg 31. Thus, the bottom portion of the back surface 302 may also be considered a leg 31. As discussed above, the apex 300 may be centered (not shown), and the back surface may also be provided with an attack surface such that the spoiler forms an isosceles triangle (with or without concave attack surface sides) such that the front of the wiper blade 1 functions the same as the back of the wiper blade 1. As illustrated in FIG. 12, the apex 300 may end before the end of cover section 3, and a top wall 303 may join the attack surface 301 and the back surface 302. An end wall 35 may be provided and used to join the ends of the top surface 30 (including the top wall 303, attack surface 301, back surface 302, and/or the apex 300) and the leg(s) 31. As shown in FIG. 36, the end wall 35 encapsulates and surrounds the wiper strip 7 and backing element 4.

As discussed above, the inner end of the cover section 3, adjacent to the mounting base 2, may have an extension recess 36, which receives the projecting extension 26 from the mounting base 2. As also discussed above, an extension recess 36 may be provided with a securing hole 37 that receives a cover securing peg 27 from the mounting base. As discussed above, persons of skill in the art will recognize that the cover securing peg 27 and securing hole 37 may engage via a snap fit, friction fit, or other form fitting connection. Persons of skill in the art will recognize that securing mechanism may be swapped, having the securing holes located in the mounting base 2, and the securing pegs located in the cover section/backing element. Persons of skill in the art will also recognize that any other suitable securing mechanism known in the art may be used, including detents and recesses, dovetails, opposed projections, and other such structures may be used. Persons of skill in the art will also recognize that the securing mechanism need not be on the top surface of the projecting extension and bottom surface of the extension recess, but may be on the side, or may extend from the side of the shoulder, or any other arrangement known in the art. The extension recess 36 may have walls and a bottom claw 362 to cover and secure the projecting extension 26 of the mounting base.

The cover section may also have a bottom surface 38. The bottom surface 38, together with the legs 31, may define a backing element cavity 33 to receive the backing element 4. Each leg 31 may also define a top claw 34 and a bottom claw 32. The bottom surface 38 may be recessed from the top claws 34 such that the backing element cavity 33 may have a top cavity 330 to receive a top portion 40 of the backing element 4. The legs 31, including the top claws 34 and bottom claws 32, may define one or more channel cavities 331, which may be sized to receive the rails 44 of the backing element 4, and one or more vertebrae 6. If no vertebrae are included, the legs may define an intermediate claw to engage a groove 45, if one is present between the rails 44. The claws 32, 34 may extend along the entire length of the cover section, or may be intermittent, or have gaps. The cover section may optionally have backing element securing structures, such as pegs, detents, shoulders, projections, recesses, holes, and other such structures known in the art, along the bottom surface 38, the claws 32, 34 or the groove formed therebewteen, such that these securing structures engage corresponding complementary securing structures in the backing element 4, such as holes, shoulders, detents, recesses, projections, pegs and other such structures known in the art.

FIGS. 21-28 illustrate an exemplary backing element 4 in accordance with the disclosed concepts. The backing element 4 is preferably made of hard, elastic plastic, though any other suitable material or combination of materials known in the art, including metals, rubber, and resins, for example, may be used. In some embodiments, the backing element 4, or portions thereof may be made from a material having a Shore Hardness A of 85±5 or greater. In some embodiments, the backing element 4, or portions thereof, may be made from a material having a Shore Hardness A of 95±5 or greater. In other embodiments, the backing element 4 may be made from multiple materials, or have multiple hardnesses. Persons of skill in the art will recognize that disclosed concepts may be implemented in many different ways, and different design choices may be made with respect to materials for all components, including the mounting base. The backing element may connect to the mounting base 2, which in turn is capable of connecting to a wiper arm directly or through the use of a connector 5 or adapter. The backing element 5, alone or with the help of the vertebrae, distribute the force received from the wiper arm along the length of the wiper strip 7.

The elongate backing element 4 may have a top portion 40, from which two opposing legs 41 descend. Each opposing leg may have a claw 42 which extends towards the opposing leg. The claws 42, legs 41, and top portion 40 may define a wiper strip cavity 43 sized to receive the wide portion 75 of a wiper strip 7. Similarly, the opposing claws 42 may define a gap therebetween sized to receive the intermediate portion of 73 of a wiper strip 7—which may be narrower than the wide portion 75 of the wiper strip 7—by engaging a recess or securing groove 76 (these terms may be used interchangeably) adjacent to the intermediate portion 73.

Figure 24:
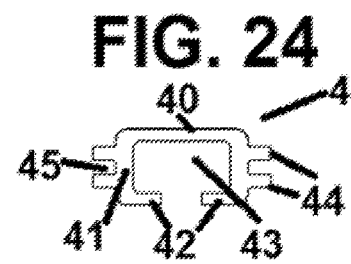
FIG. 24 illustrates a cross-sectional profile of the shaped backing element of the wiper blade shown in FIG. 1.

The backing element 4 may also have rails 44 extending along the outer surface of the legs 41 or extending from the top portion 40. As shown in FIG. 24, there may be two rails 44 extending from each outer surface of the legs 41/top portion 40 to define a groove 45 therebetween. The groove 45 may be sized to receive a vertebra 6 or flexor 6 (these terms may be used interchangeably). The rails 44 may extend along the entire length of the backing element 4, or may be intermittent or have gaps. In certain embodiments where no vertebrae are used on the outside of the backing element, the groove 45 between the rails 44 may optionally be removed. Alternatively, in other embodiments, not using rails 44 or grooves 45, the cavities in the mounting base 2 and cover sections 3 may be sized to receive and secure the entire backing element 4.

As discussed above, the backing element 4 may have securing holes 46 to receive securing pegs 28 in the mounting base. As also discussed above, the backing element may also have other securing structures, including pegs, projections, detents, recesses, holes, shoulders, and any other suitable structure known in the art in order to engage and secure a complementary structure in the mounting base 2 or cover sections 3.

As discussed above, FIG. 29 illustrates an exemplary connector that may be used in accordance with the disclosed concepts to connect the mounting base to a wiper arm. Persons of skill in the art will recognize that any suitable connector known in the art may be used with the disclosed concepts, including those set forth above and incorporated by reference.

Figure 38:
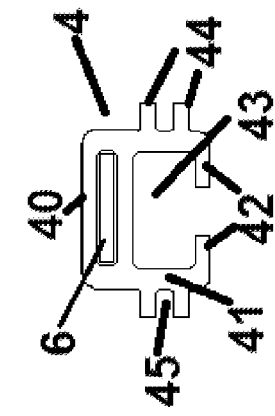
FIG. 38 illustrates a cross-sectional view of an alternative embodiment of the backing element.
Figure 39:
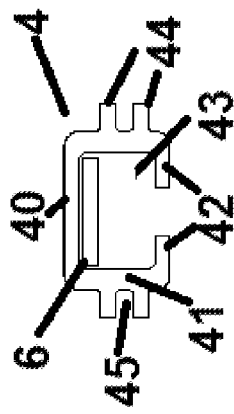
FIG. 39 illustrates a cross-sectional view of an alternative embodiment of the backing element.
Figure 40:
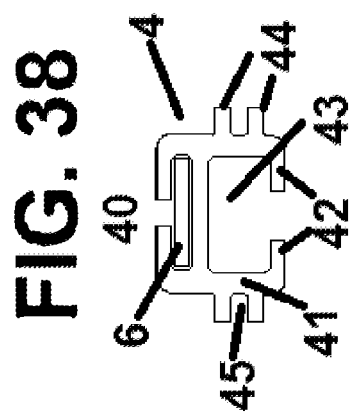
FIG. 40 illustrates a cross-sectional view of an alternative embodiment of the backing element.

FIG. 30 illustrates vertebrae in accordance with the disclosed concepts. The vertebrae are preferably made out of metal, such as steel, though may be made from any suitable material. The vertebrae may be made from a spring-elastic material, including spring-elastic metal. Accordingly, the vertebrae 6 may, with the backing element 4, distribute the force received from a wiper arm along the length of the wiper strip 7. Vertebrae may also be disposed within grooves 74 in the wide portion 75 of the wiper strip 7. In embodiments not having grooves 45 and/or outer rails 44 on the backing element 4, the vertebrae may be disposed in grooves 75 in the wiper strip, or may be disposed above the wiper strip, as shown in FIGS. 38-40.

Figure 32:
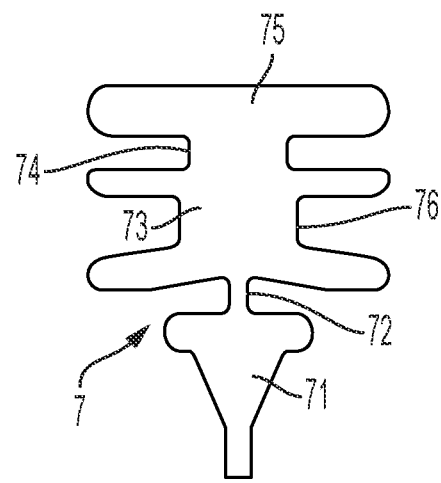
FIG. 32 illustrates a cross-sectional profile of the wiper strip of the wiper blade shown in FIG. 1.

FIGS. 31 & 32 illustrate an example wiper strip that may be used in accordance with the disclosed concepts. The wiper strip is preferably made of a soft rubber or plastic, but may be made of any suitable material. The wiper strip may have a wide portion 75 from which a narrower, intermediate portion 73 descends. The wide portion 75 may optionally have one or more grooves 74 which may optionally house vertebrae 6. The intermediate portion may be sized to fit between the claws 42 of the backing element 4, and may have a recessed portion or securing groove 76 which is sized to receive the claws 42.

Figure 33:
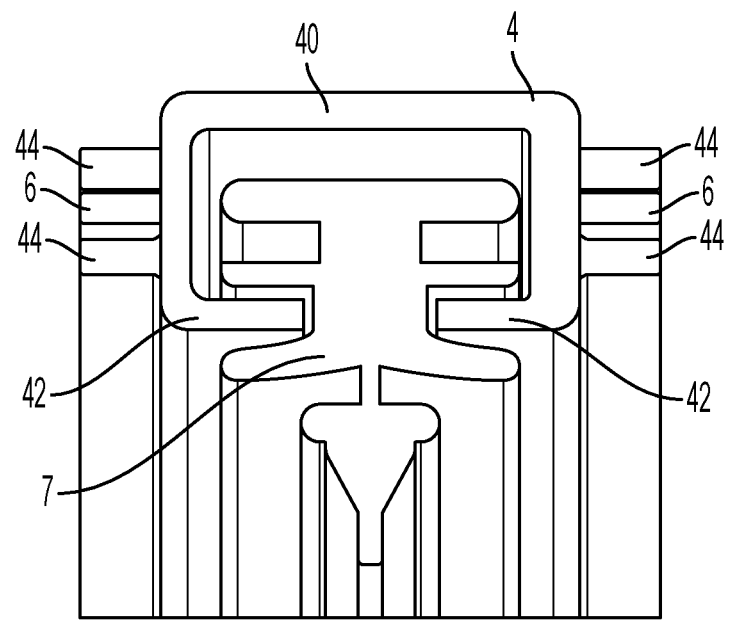
FIG. 33 illustrates a cross-sectional view from the side of the backing element, vertebrae and wiper strip of the wiper blade shown in FIG. 1.

FIG. 33 illustrates the backing element 4 of the disclosed concepts having vertebrae 6 disposed between its rails 44, and a wiper strip 7 disposed within its wiper strip cavity 43.

FIG. 34 illustrates the securing pegs 27, 28 in the mounting base which secure the carrier element 4 and cover section 3 to the mounting base 2.

FIG. 35 illustrates the securing pegs 27 in the mounting base which secures the cover section 3 to the mounting base 2.

FIGS. 1 and 36 illustrate how the end wall 35 of the cover section 3 surrounds and encapsulates the backing element 4 and wiper strip 7 to secure them against longitudinal movement.

Figure 37:
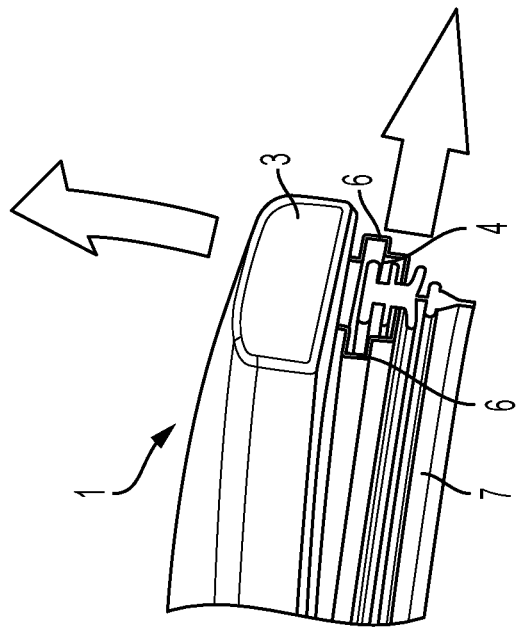
FIG. 37 illustrates a perspective view from the side of the end of the wiper strip, backing element, vertebrae and cover section of the wiper blade shown in FIG. 1.

FIG. 37 illustrates how the cover section 3 of the disclosed concept can be disengaged from the rails 44 of the backing element 4 and folded upwards. This allows a user to slidably remove the wiper strip 7 from the backing element 4 and to replace it with a new wiper strip 7. In this fashion, the disclosed concept allows for a refillable wiper blade, such that the end user of the product does not need to replace the entire product when ordinary wear and tear on the wiper strip 7 requires its replacement. Instead, the user can simply fold up the end of the cover section 3 of the wiper blade 1, as shown in FIG. 37, and quickly remove the old wiper strip and slide in a new wiper strip. In some embodiments, the claws 32, 34 of the cover section may end a distance away from the end wall 35 to facilitate the folding up of the cover strip to allow access to the backing element 4 and wiper strip 7.

As discussed above, FIGS. 38-40 illustrate alternative embodiments of the backing element 4 having a singular internal vertebra. If the embodiment illustrated in FIG. 38, the top portion 40 of the backing element contains a gap, there is an internal wall defining a cavity between the top portion and the internal wall, and the vertebra 6 resides in that cavity. In the embodiment illustrated in FIG. 39, there is an internal wall defining a cavity between the top portion 40 and the internal wall and the vertebra 6 resides in that cavity. In the embodiment illustrated in FIG. 40, there vertebra 6 is inserted into the wiper strip cavity 43 above the wiper strip.

Those skilled in the art will recognize that while the invention will most likely be used in conjunction with automobiles, it is suitable for use with any vehicle. For example, in addition to automobiles, trucks, buses, locomotives, aircrafts, or any other vehicle type that uses a windshield wiper can benefit from the invention.

While specific embodiments have been discussed to illustrate the invention, it will be understood by those skilled in the art that the descriptions herein are intended as illustrative, and not as limiting, and that variations in the embodiments can be made without departing from the spirit of the invention.

Accordingly, the foregoing descriptions are intended as illustrative, and not as limiting.

LIST OF REFERENCE NUMBERS

1. Wiper blade.
2. Mounting base.
20. Cavity walls.
21. Rivet.
22. Pin holes.
23. Connector cavity.
24. Base wall.
240. Base bottom surface.
241. Bottom base claw.
242. Top base claw.
25. Shaped shoulder.
26. Projecting extension.
261. Extension bottom claw.
262. Extension top claw.
27. Cover securing peg
28. Backing element securing peg.
29. Backing element cavity.
290. Backing element top cavity
291. Backing element channel cavity.
3. Cover section.
30. Top surface.
300. Apex.
301. Attack surface.
302. Back surface.
303. Top wall.
31. Leg.
32. Bottom claw
33. Backing element cavity.
330. Backing element top cavity.
331. Backing element channel cavity.
34. Top claw
35. End wall
36. Extension recess.
362. Extension bottom claw.
37. Securing hole.
38. Bottom surface
4. Backing element.
40. Top portion
41. Legs.
42. Claw
43. Wiper strip cavity.
44. Rail.
45. Groove.
46. Securing hole
5. Connector.
6. Vertebra/vertebrae.
7. Wiper strip.
71. Wiper lip.
72. Neck
73. Intermediate portion.
74. Vertebra groove.
75. Wide portion.
76. Securing groove.

I claim:

1. A wiper blade comprising:
a mounting base capable of connecting the wiper blade to a wiper arm of a vehicle, the mounting base having a base section, a longitudinal end, a cover securing peg provided proximate the longitudinal end, and a backing element cavity defined within the base section;

an elongate backing element having a top portion secured to the mounting base within the backing element cavity, and a wiper strip cavity;

a cover having a cover securing hole engageable with the cover securing peg, the cover securing hole being shaped and sized to receive and completely encircle the cover securing peg such that significant lateral movement of the cover securing peg within the cover securing hole is prevented; and an elongate wiper strip comprising a wiping lip, a wide portion, and an intermediate portion between the wiping lip and the wide portion, wherein the intermediate portion is narrower than the wide portion, and the wide portion is disposed within the wiper strip cavity.

2. The wiper blade of claim 1, wherein the top portion of the backing element further comprises a backing element securing hole disposed within the section of the backing element on which the mounting base is disposed, and wherein the mounting base further comprises a backing element securing peg, the backing element securing hole being shaped and sized to receive and completely encircle the backing element securing peg such that significant lateral movement of the backing element securing peg within the backing element securing hole is prevented.

3. The wiper blade of claim 1, wherein the cover includes a first and second cover section, each cover section including a cover securing hole, wherein the mounting base has an opposite longitudinal end, and an additional cover securing peg provided proximate the opposite longitudinal end for engaging with the cover securing hole of the second cover section.

4. The wiper blade of claim 3, wherein the first cover section extends from the longitudinal end of mounting base to a first longitudinal end of the backing element.

5. The wiper blade of claim 4, wherein the second cover section extends from the opposite longitudinal ends of the mounting base to a second longitudinal end of the backing element.

6. The wiper blade of claim 5, wherein the first and second cover sections each include at least one leg, each at least one leg including a bottom claw securable with the backing element.

7. The wiper blade of claim 5, wherein the first and second cover section each include a backing element cavity, and the backing element includes a covered section disposed within the backing element cavity.

8. The wiper blade of claim 7, wherein the backing element includes a first rail, and the covered section includes a backing element channel cavity such that the first rail is disposed withing the backing element channel cavity along the covered section.

9. The wiper blade of claim 8, wherein the backing element includes a second rail, wherein a first groove is formed by the and between the first and second rails.

10. The wiper blade of claim 9, wherein a vertebra is disposed within the first groove.

11. The wiper blade of claim 1, wherein the backing element cavity of the mounting base is defined by a first and second base wall which extends downward from a bottom surface of the mounting base as well as a bottom base claw which extends inwardly towards the other base wall.

12. The wiper blade of claim 1, wherein the backing element wiper strip cavity is defined by the top portion of the backing element, two opposing legs descending from the top portion, and a claw extending from each leg to an opposing leg.

13. The wiper blade of claim 12, wherein a vertebra is disposed in the wiper strip cavity.

* * * * *